United States Patent
Lutz et al.

(10) Patent No.: US 8,219,399 B2
(45) Date of Patent: Jul. 10, 2012

(54) AUTOMATED SPEECH RECOGNITION (ASR) TILING

(75) Inventors: Pascal M. Lutz, Leawood, KS (US);
Jacob W. Caire, Olathe, KS (US);
Kenneth A. Bolton, Olathe, KS (US);
Cory J. Stricklin, Olathe, KS (US)

(73) Assignee: Garmin Switzerland GmbH (CH)

( * ) Notice: Subject to any disclaimer, the term of this patent is extended or adjusted under 35 U.S.C. 154(b) by 775 days.

(21) Appl. No.: 11/960,965

(22) Filed: Dec. 20, 2007

(65) Prior Publication Data
US 2009/0018840 A1    Jan. 15, 2009

Related U.S. Application Data

(60) Provisional application No. 60/949,158, filed on Jul. 11, 2007.

(51) Int. Cl.
*G10L 21/00* (2006.01)
(52) U.S. Cl. .............. 704/270; 704/270.1; 704/272
(58) Field of Classification Search .............. 704/275, 704/257, 270, 231, 9, 4, 10, 270.1, 251, 254, 704/255, 1, 235, 272
See application file for complete search history.

(56) References Cited

U.S. PATENT DOCUMENTS

| | | | |
|---|---|---|---|
| 5,386,494 A | 1/1995 | White | 395/2.84 |
| 5,524,169 A | 6/1996 | Cohen et al. | 395/2.4 |
| 6,112,174 A | 8/2000 | Wakisaka et al. | 704/251 |
| 6,526,381 B1 | 2/2003 | Wilson | 704/251 |
| 6,741,963 B1 | 5/2004 | Badt et al. | 704/270 |
| 7,024,364 B2 | 4/2006 | Guerra et al. | 704/270 |
| 7,047,198 B2 | 5/2006 | Ono et al. | 704/275 |
| 7,072,837 B2* | 7/2006 | Kemble et al. | 704/257 |
| 7,324,945 B2* | 1/2008 | Butzberger et al. | 704/270.1 |
| 7,328,155 B2* | 2/2008 | Endo et al. | 704/251 |
| 7,472,020 B2 | 12/2008 | Brulle-Drews | 701/211 |
| 7,630,900 B1* | 12/2009 | Strom | 704/275 |
| 7,729,913 B1* | 6/2010 | Lee et al. | 704/254 |
| 2006/0074660 A1 | 4/2006 | Waters et al. | 704/251 |
| 2009/0037174 A1* | 2/2009 | Seltzer et al. | 704/251 |

FOREIGN PATENT DOCUMENTS

| | | |
|---|---|---|
| EP | 1233407 B1 | 11/2006 |
| KR | 10-2003-0017045 | 3/2003 |
| KR | 10-2006-0114943 | 11/2006 |

OTHER PUBLICATIONS

International Search Report from corresponding International Application No. PCT/US2008/065963, dated Dec. 17, 2008.
Office Action dated Oct. 29, 2010 from U.S. Application U.S. Appl. No. 11/960,423, filed Oct. 29, 2010.
Office Action dated Mar. 10, 2011 from U.S. Appl. No. 11/960,423, filed Dec. 19, 2007.

* cited by examiner

*Primary Examiner* — Huyen X. Vo
(74) *Attorney, Agent, or Firm* — Samuel M. Korte (57) ABSTRACT

Techniques are described related to tiles of automated speech recognition data. In an implementation, automated speech recognition (ASR) data is obtained. The ASR data is divided into a plurality of tiles based on an approximate amount of data to be included in each tile. Each of the tiles is a partition of the ASR data.

11 Claims, 5 Drawing Sheets

AUTOMATED SPEECH RECOGNITION (ASR) TILING

RELATED APPLICATION

The present non-provisional application claims the benefit of U.S. Provisional Application No. 60/949,158, entitled "AUTOMATED SPEECH RECOGNITION (ASR) TILING," filed Jul. 11, 2007, which is herein incorporated by reference in its entirety.

BACKGROUND

Positioning systems, such as the global positioning system (GPS), may be employed by a wide variety of devices to provide a variety of different functionality to users. For instance, position-determining functionality may be incorporated within a portable device such that it may be mounted in a variety of different vehicles to provide navigation instructions, such as turn-by-turn driving instructions in a car or motorcycle. In other instances, position-determining functionality may be incorporated as a part of instrumentation within an airplane to give flight data, may be mounted on a boat to provide positional awareness on a body of water (e.g., where the boat is located and how deep the water is at that position), incorporated within fitness equipment, and so forth.

In at least some of these instances, it may be desirable to use the position-determining functionality, as well as with other functionality of a device that incorporates position-determining functionality, without requiring the use of a user's hands. For example, a device incorporating position-determining functionality may be configured for use in a car and therefore it may be desirable to enable users to interact with the device without taking their hands off a steering wheel. One such technique that may be employed to provide such functionality is automated speech recognition (ASR). ASR is typically employed to translate speech into a form to extract meaning from the speech (e.g., text, numerical representation, and so on) which may then be used to perform a desired function. Traditional techniques that were employed to provide ASR, however, typically consumed a significant amount of resources (e.g., processing resources) and therefore could be expensive to implement. Additionally, this implementation may be further complicated when confronted with a large amount of data, such as an amount of data that may be encountered in a device having position-determining functionality.

SUMMARY

Techniques are described to create tiles of data to be used in automated speech recognition (ASR). In an implementation, automated speech recognition (ASR) data is obtained. The ASR data is divided into a plurality of tiles. Each of the tiles is a partition of the ASR data.

In another implementation, one or more of a plurality of tiles are selected, each of which is a partition of automated speech recognition (ASR) data. The selecting is based on information related to a search to be performed using an audio input and a geographic location. The ASR data of the selected one or more tiles is combined and used to translate the audio input.

This Summary is provided as an introduction to subject matter that is fully described in the Detailed Description and Drawings. Accordingly, the Summary should not be considered to describe essential features nor be used to determine the scope of the Claims.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Traditional techniques that were employed to provide automated speech recognition (ASR) typically consumed a significant amount of resources, e.g., processing and memory resources. Implementation of ASR may also be complicated when confronted with a large amount of data, such as an amount of data that may be encountered in a device having position-determining functionality, such as a database containing points of interest, addresses, phone numbers, and so on.

For example, a personal Global Positioning System (GPS) device may be configured for portable use and therefore have relatively limited resources (e.g., processing resources, mass storage capacity, random access memory, and so on) when compared to devices that are not configured for portable use, such as a server or a desktop computer. The personal GPS device, however, may include a significant amount of data that is used to provide functionality based on a determined geographic position. For instance, a user may speak a name of a desired restaurant. In response, the personal GPS device may translate the spoken name, which may consume a significant amount of resources. The personal GPS device may also determine a current geographic location and then use this location to search data to locate a nearest restaurant with that name or a similar name, which may also consume a significant amount of resources.

Accordingly, techniques are described that involve automated speech recognition (ASR) tiling, which may be used to improve efficiency and accuracy in ASR. In an implementation, data that is used to implement ASR is referred to as ASR data, such as addresses, points-of-interest, and so on. The ASR data is divided into a plurality of tiles, which are geographic partitions of the data. Data within particular tiles may then be searched based on a geographic location, such as the ASR data within a tile that corresponds to a user's current position, a desired destination, a calculated route, and so on. In this way, the amount of ASR data that is searched may be reduced, thereby improving accuracy and increasing efficiency in the use of resources of the device. Further discussion of ASR data tile creation may be found in relation to FIGS. 3 and 4.

In another implementation, techniques are described to create and utilize a "common" tile. For example, a common tile may be used to include "redundant" ASR data that may have been included in a plurality of tiles otherwise, thereby reducing the number of occurrences of the data and reducing the amount of data to be stored and searched. In an example of points-of-interest, common chain brands that are likely to be included in a plurality of tiles are included in a common tile to reduce and even eliminate duplication of this data in the plurality of tiles. The common tile may then be used to improve efficiency in speech recognition, further discussion of which may be found in relation to FIG. 5.

In the following discussion, an exemplary environment is first described that is operable to perform the ASR tiling techniques. Exemplary procedures are then described which may be employed in the exemplary environment, as well as in other environments without departing from the spirit and scope thereof.

Figure 1:
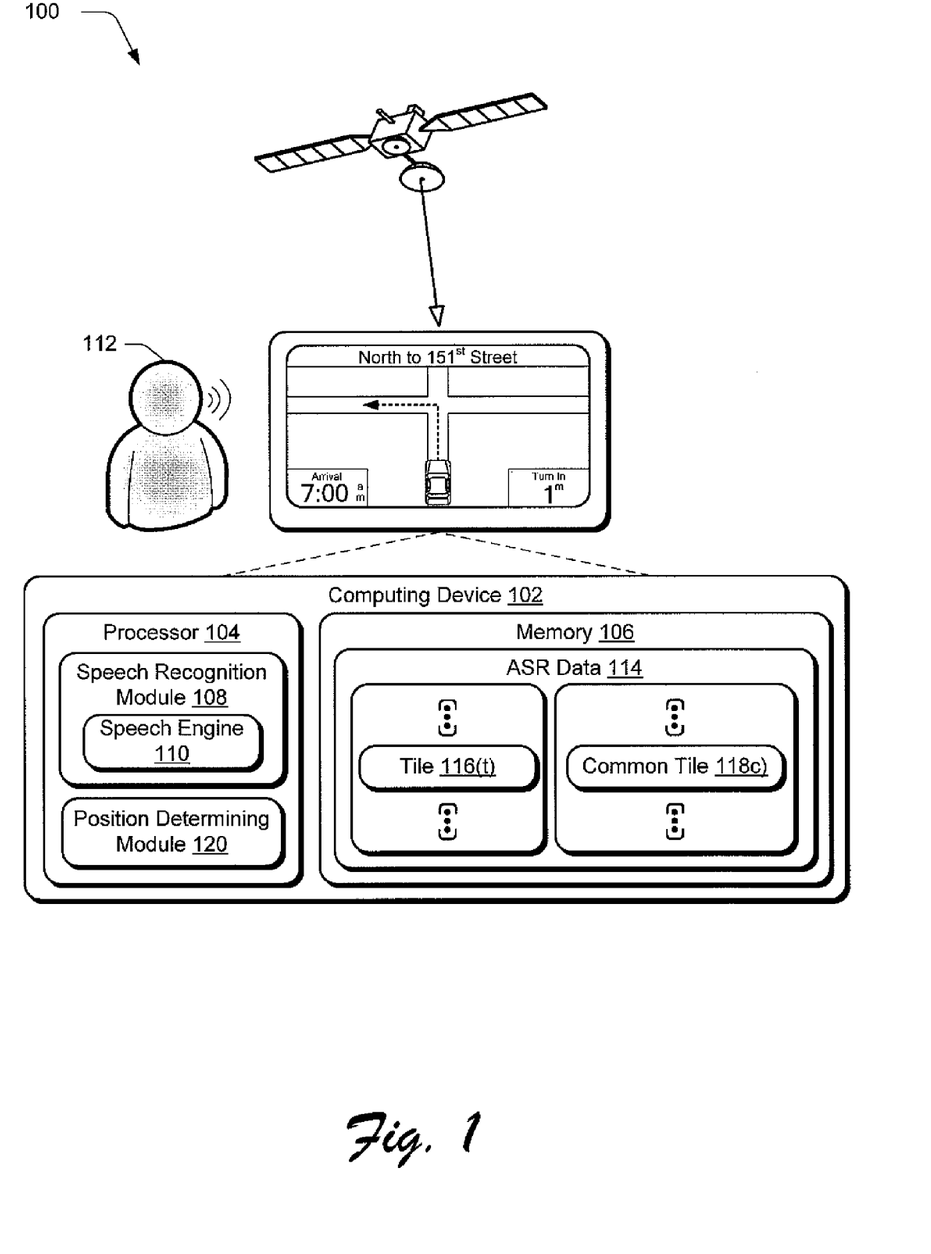
FIG. 1 is an illustration of an environment in an exemplary implementation that is operable to provide position-determining techniques, an example of which is illustrated in FIG. 1 as a Global Positioning System (GPS).

FIG. 1 illustrates an exemplary environment 100 operable to employ automated speech recognition tiling techniques. The illustrated environment 100 includes a computing device 102 having one or more processors 104 and memory 106. The computing device 102 may additionally include a microphone and/or other device for detecting user speech, a display for visibly presenting speech and navigation-related information to the user, and a speaker for audibly communicating with the user. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 106 is shown, a wide variety of types and combinations of memory may be employed, such as random access memory (RAM), hard disk memory, removable medium memory, and other types of computer-readable media.

The computing device is illustrated as executing a speech recognition module 108 on the processor 104, which is also storable in memory 106. The speech recognition module 108 is representative of techniques that are involved in automated speech recognition (ASR). For example, the speech recognition module 108 may employ a speech engine 110 that is representative of functionality to extract meaning from an audio input provided by a user 112, such as to convert the audio input into text or another form to understand "what the user meant". Thus, the output of the speech engine 110 is not necessarily text, as it may be more efficient to encode the meaning using numeric identifiers as they are more compact and are more efficiently processed computationally. A variety of other examples are also contemplated.

The speech recognition module 108 may also be representative of functionality to employ tiling techniques to ASR data 114. As previously described, large data sets such as those encountered in navigation devices may complicate performance of ASR techniques. For example, the larger the data set, the longer it may take to perform ASR. Additionally, the larger the data set, the higher the risk of confusion of what was spoken with a non-relevant item in the data set. Therefore to improve both speed and accuracy when performing ASR, the ASR data 114 may be arranged such that portions of the ASR data may be fetched when desired. This arrangement may be performed in a variety of ways.

For example, the ASR data 114 may be arranged "vertically" into categories. Therefore, a search may be performed for "restaurants" without search for grocery store data. The ASR data 114 may also be portioned into one or more tiles 116(t) that are geographic partitions of the ASR data 114. Thus, a proximity search may be conducted by merging data from tiles relating to a desired geographic location, such as a current position of the computing device 102.

Additionally, certain elements of the ASR data 114 are likely to be searched independently from a search location. For example, the user 112 may frequently search for these elements even if their occurrence in the ASR data 114 is minimal, the elements may have multiple occurrences in a large number of tiles, and so on. Therefore, to avoid having the same elements (e.g., as an ASR utterance) repeated in each tile 116(t), one or more common tiles 118(c) may be formed to include this ASR data 114, i.e., the "elements". Therefore, when a search is performed, one or more common tiles 118(c) and tiles 116(t) that provide geographic partitions may be combined to include utterances in a recognizable vocabulary that are likely to be uttered by the user 112.

Optionally, the computing device 102 may employ a position-determining module 120 to provide position-determining functionality, which may be used in conjunction with the ASR techniques. For example, a voice-driven search may be performed that leverages a current position of the computing device 102, an input destination, positions along a route, and so on.

Position-determining functionality, for purposes of the following discussion, may relate to a variety of different navigation techniques and other techniques that may be supported by "knowing" one or more positions of the position-determining device 104. For instance, position-determining functionality may be employed to provide location information, timing information, velocity information, and a variety of other navigation-related data. This information may be obtained in a variety of ways, such as through use of radio-positioning techniques as illustrated (e.g., LORAN, GPS, GLONASS, GALILEO, etc.), inertial positioning techniques, cell-network positioning techniques, techniques that take advantage of existing signals not originally intended for positioning (e.g., WiFi), and so on. Accordingly, the position-determining device 104 may be configured in a variety of ways to perform a wide variety of functions. For example, the positioning-determining device 104 may be configured for vehicle navigation as illustrated, aerial navigation (e.g., for airplanes, helicopters), marine navigation, personal use (e.g., as a part of fitness-related equipment), and so forth.

Thus, the ASR data 114 may include geographic content that is ASR enabled, such as a collection of named geo-referenced data partitioned horizontally over a complete geographic space and organized vertically in one or more data categories, such as points-of-interest, airports, restaurants, grocery stores, and so on. The complete geographic space is the geographic area of interest for a given system, such as fifty US states, USA and Canada, Western Europe, a single or a smaller group of countries, and so on. Thus, the tiles 116(t) may form partitions of this geographic content to be ASR enabled, which may be stored in an ASR data form, and limited to items located within the tile coverage area and belonging to the desired data category.

The common tiles 118(c) define a common geographic space, which is the geographic area having aggregated common data, such as due to redundancy or likelihood of use. In Europe, for instance, common data may be aggregated separately for France and Germany because a common brand in France may not be a common brand in Germany, and vice versa. Therefore, for Europe the common geographic partitions may correspond to countries, while in the U.S. the common geographic partitions may be states (e.g., because some popular grocery stores in California might not exist in Kansas). The common geographic space may also depend on a category as previously described for geographic partitions.

Therefore, the coverage area of the tiles 116(*t*) may be defined to ensure storage and ASR processing efficiency for desired use cases. The tiles 116(*t*) may be organized in vertical layers (e.g., categories) so as to allow a search in one or more categories by merging tiles from one or more layers as appropriate. In an implementation, the coverage area for respective tiles may be determined so as to ensure a homogeneous tile storage size within a layer. As a result, tile coverage areas are not necessarily consistent in one layer and are driven by the local geographic density of data (one would expect smaller coverage areas in urban regions than in rural regions). Also, tile coverage areas are not necessarily consistent across layers, as some categories may be less dense than others. For example, one could expect less data density for airports or amusement parks than for fast food restaurants, an example of which may be found in relation to the following figure. Within a single layer, the set of geographic tiles may mosaic the complete geographic space without overlap.

The coverage area of the common tiles 118(*c*) is a common geographic space. The common tiles 118(*c*) may also be organized in layers (e.g., categories) so as to allow a search in one or more categories by merging tiles from one or more layers as appropriate. When the complete geographic space contains more than one common geographic space for a data category of interest, the common tiles 118(*c*) may be merged if the search is centered close to the border between two or more common geographic spaces. For instance, a user located near the border between France and Germany may search the ASR data 114 by proximity using both the content from a French common tile and a German common tile.

Figure 2:
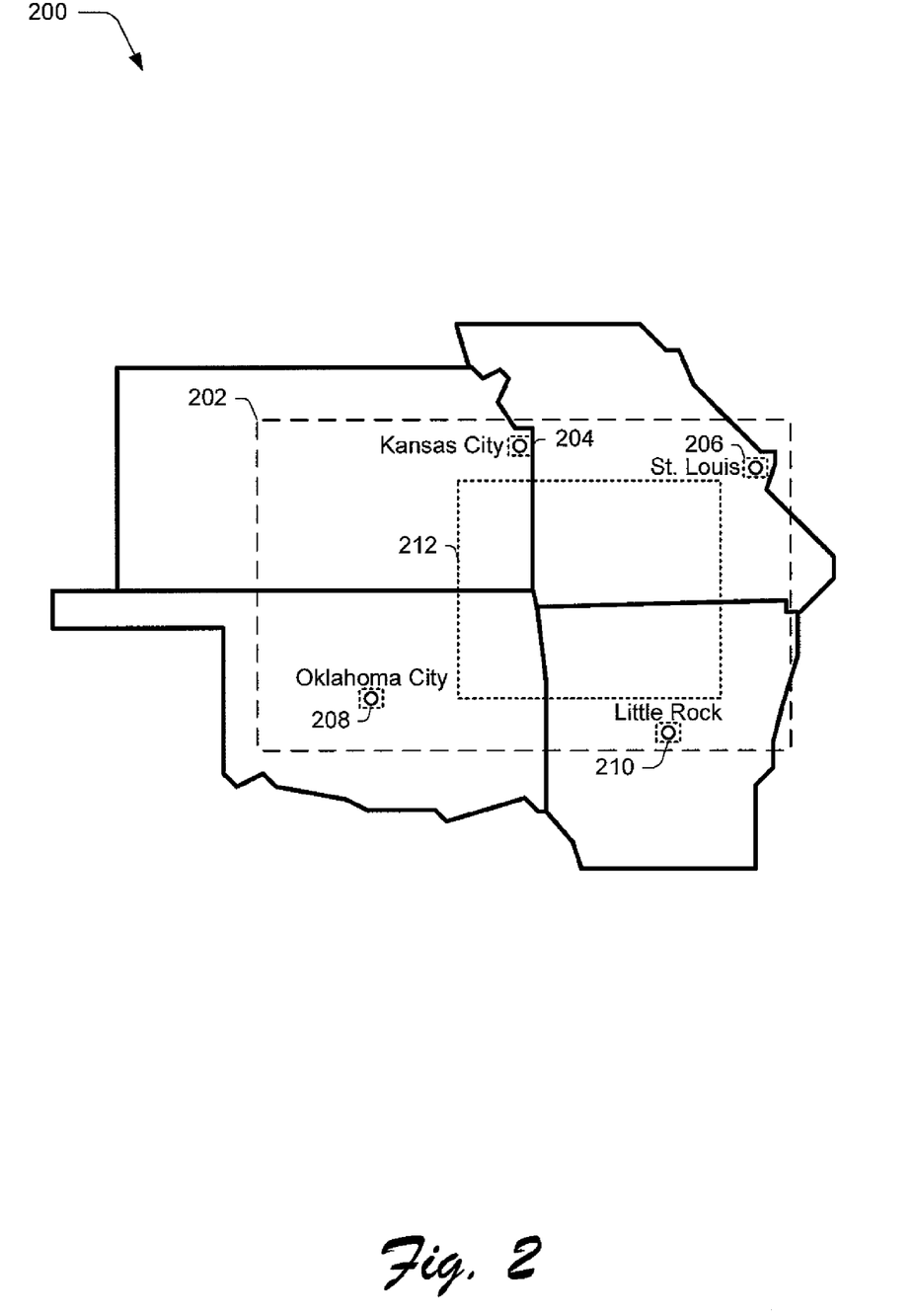
FIG. 2 is an illustration of a system in an exemplary implementation showing ASR data tiling that may be employed by the environment 100 of FIG. 1.

FIG. 2 depicts an exemplary implementation of ASR data tiling that may be employed by the environment 100 of FIG. 1. The illustrated implementation shows a region 200 that includes four states, which are depicted as Kansas, Missouri, Oklahoma and Arkansas. Dashed boxes are also illustrated which represent tiles that are geographic partitions of ASR data that correspond to respective portions of the region 200. In an implementation, the geographic partitions are sized based on a respective amount of data to be included in a tile. Consequently, the "size" of the geographic area that corresponds to the ASR data that may be included in the tile may vary.

For example, tile 202 may be representative of a tile that includes ASR data that describes "airports". Consequently, this tile 202 may correspond to a geographic partition that covers most of the illustrated region. Tiles 204-212, however, may correspond to ASR data that describes "restaurants". Therefore, individual tiles 204-210 may be utilized for Kansas City, St. Louis, Oklahoma City and Little Rock, respectively. Further, tile 212 that corresponds to a larger geographic area may be utilized to cover an area between these major cities. Thus, a geographic area that corresponds to tiles that represent different categories of data may differ, one from another. Further, the geographic area that corresponds to tiles in a particular category may also differ, one to another. A variety of techniques may be used to divide the ASR data, further discussion of which may be found in relation to the following exemplary procedures.

Generally, any of the functions described herein can be implemented using software, firmware, hardware (e.g., fixed logic circuitry), manual processing, or a combination of these implementations. The terms "module" and "functionality" as used herein generally represent software, firmware, hardware or a combination thereof. In the case of a software implementation, for instance, the module represents executable instructions that perform specified tasks when executed on a processor, such as the processor 120 of the position-determining device 104 of FIG. 1. The program code can be stored in one or more computer readable media, an example of which is the memory 118 of the position-determining device 104 of FIG. 1. The features of the ASR tiling techniques described below are platform-independent, meaning that the techniques may be implemented on a variety of commercial computing platforms having a variety of processors.

The following discussion describes ASR tiling techniques that may be implemented utilizing the previously described systems and devices. Aspects of each of the procedures may be implemented in hardware, firmware, software or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and/or the region 200 of FIG. 2.

Figure 3:
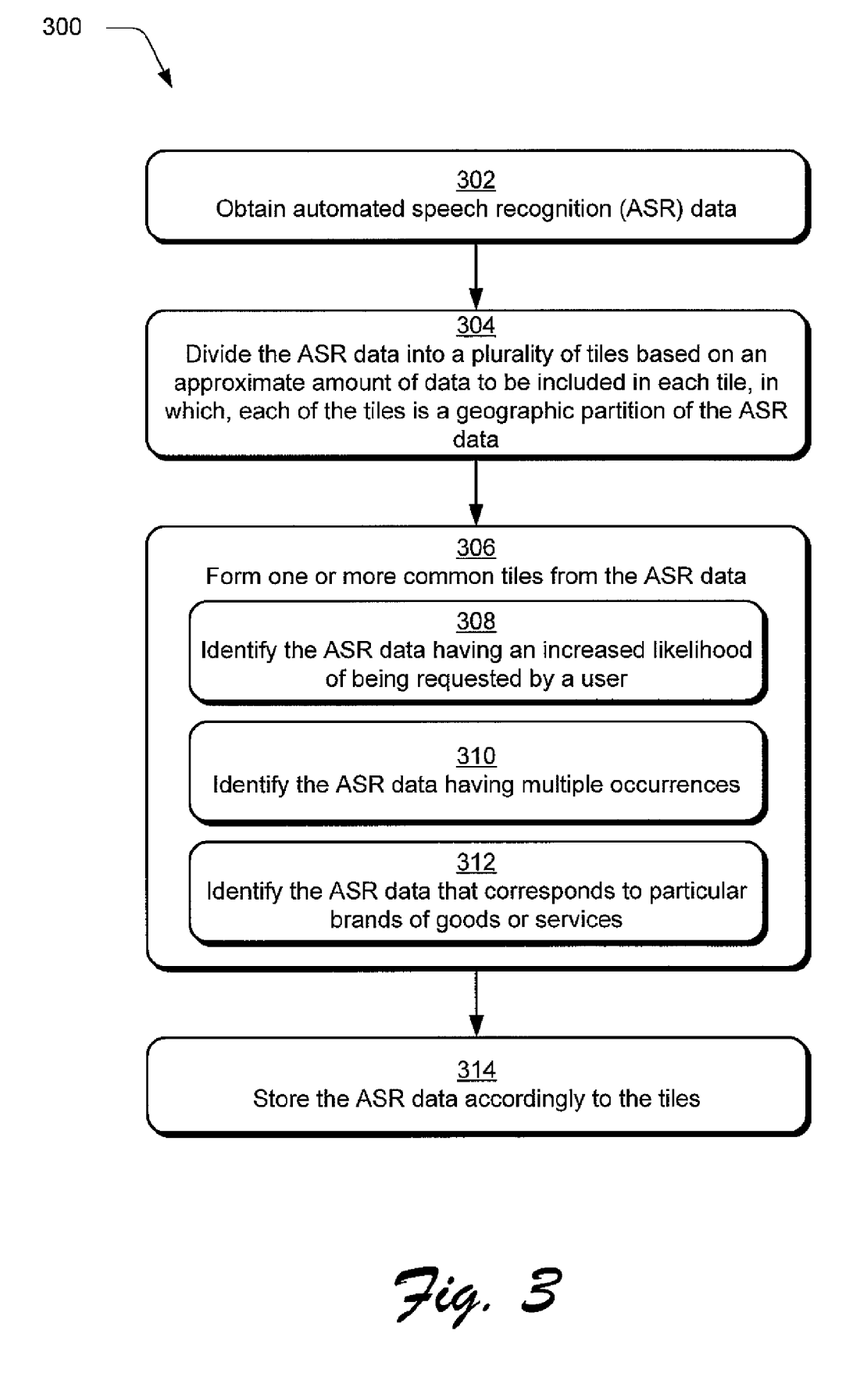
FIG. 3 is a flow diagram depicting a procedure in an exemplary implementation in which tiles are formed by dividing ASR data into geographic partitions to form tiles.

FIG. 3 depicts a procedure 300 in an exemplary implementation in which ASR data is divided into geographic partitions to form tiles. Automated speech recognition (ASR) data is obtained (block 302). As previously described, ASR data relates to data that may be used in conjunction with ASR and thus may assume a wide variety of configurations. For example, the ASR data may include data related to position-determining techniques, such as points-of-interest (POI), addresses (e.g., city, state, street), and so on. ASR data may also describe a variety of other data, such as phone numbers, and so forth. Thus, this data may be obtained from a variety of different sources, such as web services, data collection services, and so on.

For example, the ASR data is divided into a plurality of tiles based on an approximate amount of data to be included in each tile, in which, each of the tiles is a geographic partition of the ASR data (block 304). For example, a threshold amount of data may be specified for an amount of data to be included in a single tile. This threshold may be derived using a variety of techniques, such as based on an amount of available resources, to correspond with a minimal geographic area likely to be searched, based on test cases of user interaction, machine learning, and so on. Each title may include any number of data items or entries, including a single item or entry.

This threshold may then be used to create tiles, such as tiles in particular categories of ASR data. For example, the ASR data may be configured for use in conjunction with position-determining techniques and therefore may include addresses, points-of-interest, phone numbers, and so on. Data in each of these categories may then be tiled for later searching. A variety of other examples are also contemplated.

Additionally or alternatively, non-geographic criteria may be utilized to partition the ASR data into a plurality of tiles, such as by category, data compression characteristics, address type, combinations thereof, and the like. For example, the ASR data may be partitioned by category into a plurality of tiles, such as where each tile corresponds to a different category of speech data (e.g., restaurant data, city data, street data, entertainment data, goods and services data, and the like). ASR data may also be partitioned to maximize the data compression characteristics of data associated with each tile, such as by associating similarly compressible data or data types with the same tiles to limit the memory consumed by compressed ASR data tiles.

ASR data may also be partitioned based on address type. For example, street addresses may present various forms, such as simple numeric forms (e.g., 100), divided numeric forms (e.g., 10-12), and complex alphanumeric forms (e.g., B451G). The tiles may be partitioned based on address form to facilitate ASR, as is discussed below.

One or more common tiles are formed from the ASR data (block 306). As previously described, common tiles may be used in a variety of ways to improve efficiency of the ASR techniques. For example, ASR data may be identified that has an increased likelihood of being requested by a user (block 308), such as data that has been previously requested by a user, data typically searched by users of a position-determining device, and so on.

In another example, ASR data that has multiple occurrences is identified (block 310). The ASR data, for instance, may be divided into categories, such as various categories of points-of-interest including restaurants and shopping. An upscale store that also includes a restaurant may thus have entries in both categories. Therefore, instead of including this data in multiple tiles that correspond to a particular geographic area, it may be consolidated into a common tile for that area.

In a further example, ASR data is identified that corresponds to particular brands of goods or services (block 312). For instance, the ASR data may include popular brands of restaurants and stores that may be included in a common tile to ease searching of these brands, such as MCDONALDS (MCDONALDS is a registered trademark of the McDonald's Corporation, Oak Brook, Ill.). A variety of other examples are also contemplated.

The ASR data is stored according to the tiles (block 314). Data that is divided according to the geographic partitions, for instance, may then be stored and later retrieved based on a geographic location and information related to a search intended by a user. This information may take a variety of forms, further discussion of which may be found in relation to the following figure. Additionally, the data that is identified (e.g., blocks 308-312) may be stored as a common tile further discussion of which may be found in relation to FIG. 5.

Figure 4:
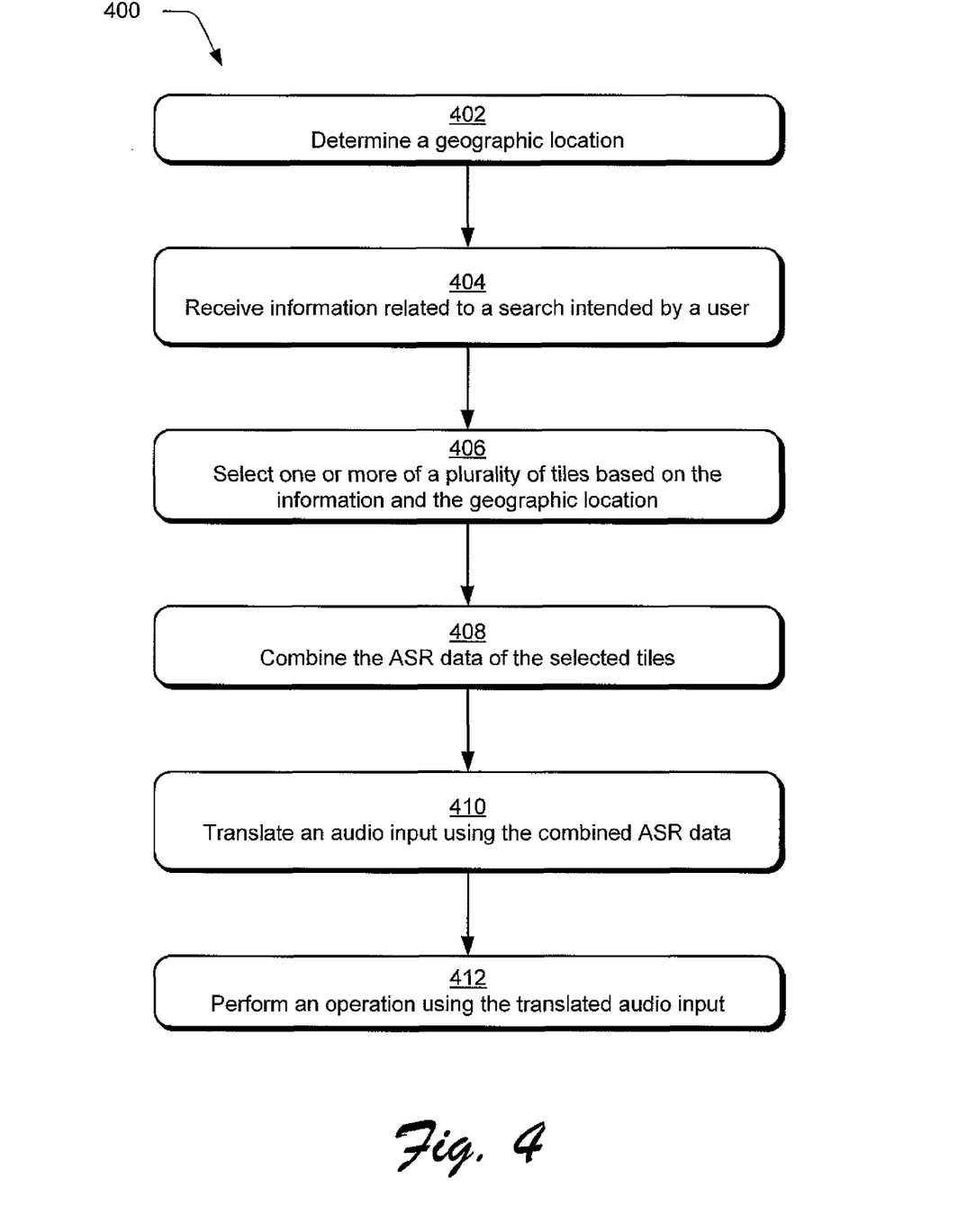
FIG. 4 is a flow diagram depicting a procedure in an exemplary implementation in which an audio input is translated using one or more tiles that define geographic partitions of ASR data.

FIG. 4 depicts a procedure 400 in an exemplary implementation in which an audio input is translated into text using one or more tiles that define geographic partitions of ASR data. A geographic location is determined (block 402). For example, the position-determining device 104 may determine the location through use of a GPS, wireless-phone based systems that broadcast position data from cellular towers, wireless networks that transmit positioning signals (e.g., through use of range measurements and/or triangulation techniques), and so on. Positioning-determining functionality may also be implemented through use of a server in a server-based architecture, from a ground-based infrastructure, through one or more sensors (e.g., gyros, odometers, magnetometers), through use of "dead reckoning" techniques, and so on. In another example, the position is determined via a manual input received from a user (e.g., an intended destination). A variety of other examples are also contemplated, such as a geographic location along a desired route, and so forth.

Information is also received that is related to a search intended by a user (block 404). The information, for instance, may be used to provide context to interactions between the user and the position determining device, such as a "vertical" scope of the search (e.g., which level data is to be searched within a hierarchy of information), "horizontal" scope of a search (e.g., a maximum desired radius setting for the search), and so on. Further, this information may be obtained from a variety of different sources, such as device settings (e.g., search radius, search center location), implicit due to current "position" within a hierarchy of information, based on previous interaction by a user, and so on.

In an implementation, persistence of this information may also vary. For example, device settings that are included in this information may have "permanent" persistence such that changed values are saved and reused for subsequent uses. In another example, the device settings may have temporary persistence such that changed values are used for a current search alone, and a next search assumes default values for the settings unless modified again as a part of this new search.

One or more of a plurality of tiles are selected based on the information and/or the geographic location (block 406). The selection may be performed in a variety of ways. For example, the tiles may be selected based on a current position within a hierarchy and a desired destination, such as "restaurants" that are located near "Olathe, Kansas". However, the tiles may be selected independent of the current geographic location of the user or any prospective or current route traveled by the user, such that the user may identify any geographic area to cause selection of one or more of the tiles.

In an implementation, the selection is continued until a threshold amount of data is obtained, such as to continue searching in different levels of a hierarchy of data, in larger geographic areas, and so on. In implementations where the ASR data is partitioned based on address type, one or more tiles may be selected based on the geographic location and the address type associated with the geographic location. For example, for geographic locations corresponding to New York where divided numeric addresses are employed, ASR tiles corresponding to divided numeric address may be selected, where for geographic locations corresponding to Kansas where simple numeric addresses are employed, ASR tiles corresponding to simple numeric addresses may be selected to facilitate rapid speech recognition.

The ASR data from the tiles is combined (block 408), which is then used to translated an audio input (block 410) to derive meaning of the input, such as text, a numerical representation, and so on. A variety of different techniques may be employed to perform this translation, such as processing by a speech engine to compare one or more suggested transcriptions with the combined ASR data to find a likely result.

In an implementation, multilingual techniques may be employed to translate between languages. For example, "phoneme" mapping may be used to allow recognition of an utterance in a language that is different from a current ASR language. "Phoneme" mapping maps phonetics of a first language into a closest match in a second language such that the utterance may be recognizable in the second language. A variety of other examples are also contemplated.

An operation is then performed using the translated audio input (block 412). For instance, the operation may be a control function of the position-determining device 104, such as to provide directions to an input address, look up a phone number, play a song, select a radio station, and so on. The results of the operation may be communicated to the user using the display or speaker to confirm proper translation of the audio input.

Figure 5:
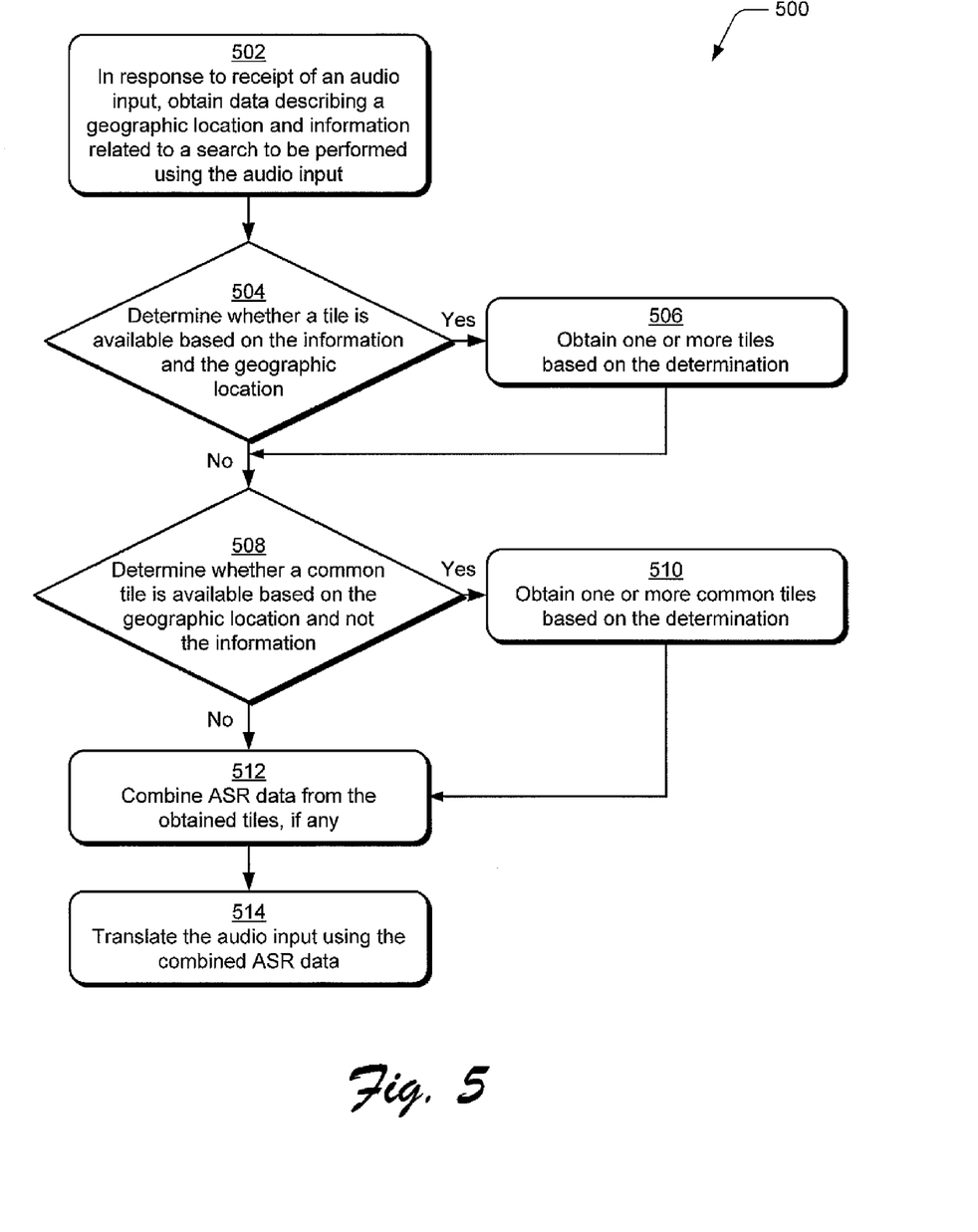
FIG. 5 is a flow diagram depicting a procedure in an exemplary implementation in which an audio input is translated using one or more tiles that define geographic partitions of ASR data and one or more common tiles.

FIG. 5 is a flow diagram depicting a procedure 500 in an exemplary implementation in which an audio input is translated using one or more tiles that define geographic partitions of ASR data and one or more common tiles. In response to receipt of an audio input, data is obtained describing a geographic location and information related to a search to be performed using the audio input (block 502). For example, a user may speak a command "Go to Chotchkie's" while the position-determining device 104 is in a "restaurant" category for points-of-interest and therefore the information is "restaurant" which provides context to the input. As previously described, the geographic location relevant to the search may be determined in a variety of ways, such as a current location, desired destination, along a route, and so on.

A determination is then made as to whether a tile is available based on the information and the geographic location (decision block 504). Continuing with the previous example, the position-determining device 104 may determine whether one or more restaurant tiles are available for the geographic location. If so ("yes" from decision block 504), one or more tiles are obtained based on the determination (block 506). In an implementation, if a threshold amount of data is not available, additional tiles may be located, such as in neighboring locations defined by neighboring tiles. In other words, tiles that correspond to neighboring geographic partitions may be obtained and/or tiles that are in different levels of a hierarchy, such as to include additional categories in the ASR data. A variety of other examples are also contemplated.

If a tile is not available based on the geographic location ("no" from decision block 504) or after the one or more tiles are obtained (block 506), a determination is made as to whether a common tile is available based on the geographic location and not the information (decision block 508). As previously described, the common tiles may be used to reduce an amount of data redundancy in the ASR data, may be configured to include ASR data that is likely to be searched regardless of the geographical location, although use of different common tiles per vertical layer is also contemplated. For example, common tiles may be used primarily as a horizontal aggregator, although vertical integration is also contemplated. Therefore, if a user has picked a vertical layer, the user may still search horizontally within that layer. Accordingly, in an implementation when a common tile is available that corresponds to a desired geographic area, ASR data is included in the search regardless of the information. For example, a popular fast food restaurant may be included in the common tile such that a user in a "shopping" context is provided with a result of the fast food search without having to be located in a "restaurant" context. Therefore, when one or more common tiles are available for the geographic location ("yes" from decision block 508), the one or more common tiles are obtained based on the determination (block 510). In another implementation, however, the common tile may be used regardless of geographic location, such as when the tile serves as a horizontal aggregator.

When a common tile is not available ("no" from decision block 508) or after the common tiles have been obtained (block 510), ASR data is combined from the obtained tiles, if any (block 512). The audio input is then translated using the combined ASR data (block 514), examples of which were previously described in relation to FIG. 4. Thus, the common tile may be used to improve efficiency and accuracy in automated speech recognition.

In some implementations, intermittent translation results may be provided while the tiles are selected and/or searched. Thus, partial matches may be identified and presented to the user for confirmation or selection while the common tile and other tiles are being selected and/or searched. Thus, if a partial but correct match is initially identified before all relevant tiles are searched, the user may confirm and select the partial match without waiting until all relevant tiles are searched.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    obtaining, by a processor associated with a portable electronic device, automated speech recognition (ASR) data, the automated speech recognition (ASR) data configured to translate an audio input;
    dividing, by the processor, the ASR data into a plurality of tiles based on an approximate amount of data to be included in each tile, wherein each of the tiles is a partition of the automated speech recognition (ASR) data and the plurality of tiles include a common tile and a plurality of geographically-partitioned tiles, wherein the common tile includes automated speech recognition (ASR) data common to at least two of the plurality of geographically-partitioned tiles, wherein the geographically-partitioned tiles are sized based on a minimum geographic search area; and
    using, by the processor, the common tile and at least one of the geographically-partitioned tiles to translate an audio input received by the portable electronic device,
    wherein the dividing includes—
        forming one or more common tiles that include a portion of said automated speech recognition (ASR) data that corresponds to particular goods or services, and
        forming one or more geographically-partitioned tiles that include a portion of said automated speech recognition (ASR) data.

2. A method as described in claim 1, wherein the ASR data includes geo-coded points of interest and addresses.

3. A method as described in claim 1, wherein the dividing includes forming one or more common tiles that include said automated speech recognition (ASR) data that are likely to be repeated in a plurality of the tiles otherwise.

4. A method as described in claim 1, wherein the dividing includes forming one or more common tiles that include a portion of said automated speech recognition (ASR) data that has been identified as having an increased likelihood of being requested by a user and is relevant to a particular geographic area that corresponds to respective said tiles.

5. A method as described in claim 1, wherein the dividing includes forming one or more common tiles that include a portion of said automated speech recognition (ASR) data that has been identified as being likely to occur multiple times in the ASR data otherwise and is relevant to a particular geographic area that corresponds to respective said tiles.

6. A position-determining device comprising:
    a processor; and
    memory configured to maintain:
        automated speech recognition (ASR) data divided according to partitions into a plurality of tiles, at least one of the tiles being configured as a common tile and a plurality of the tiles being geographically partitioned, wherein the common tile includes automated speech recognition (ASR) data common to at least two of the plurality of geographically-partitioned tiles, wherein the geographically-partitioned tiles are sized based on a minimum geographic search area; and
    one or more modules that are executable on the processor to:

select one or more of the plurality of tiles based on information related to a user-initiated search and a geographic position,
select the common tile based on the search information but not the geographic position; and
translate an audio input using the selected tiles.

7. A position-determining device as described in claim 6, wherein at least one of the common tiles includes a portion of said automated speech recognition (ASR) data that corresponds to particular goods or services.

8. A position-determining device as described in claim 6, wherein a plurality of said common tiles is organized into respective categories that are searched based on the information.

9. A position-determining device as described in claim 6, wherein at least one of the common tiles includes a portion of said automated speech recognition (ASR) data that has been identified of having an increased likelihood of being requested by a user and is relevant to the geographic position.

10. A position-determining device as described in claim 6, wherein the one or more modules are further executable on the processor to perform one or more functions using the audio input.

11. A position-determining device as described in claim 6, wherein the ASR titles are partitioned by category.

* * * * *